Sept. 24, 1940. P. BAUMANN ET AL 2,215,867
INITIATION OF ELECTRIC ARCS FED BY CONTROLLED RECTIFIERS
FOR CARRYING OUT CHEMICAL REACTIONS
Filed Feb. 7, 1939
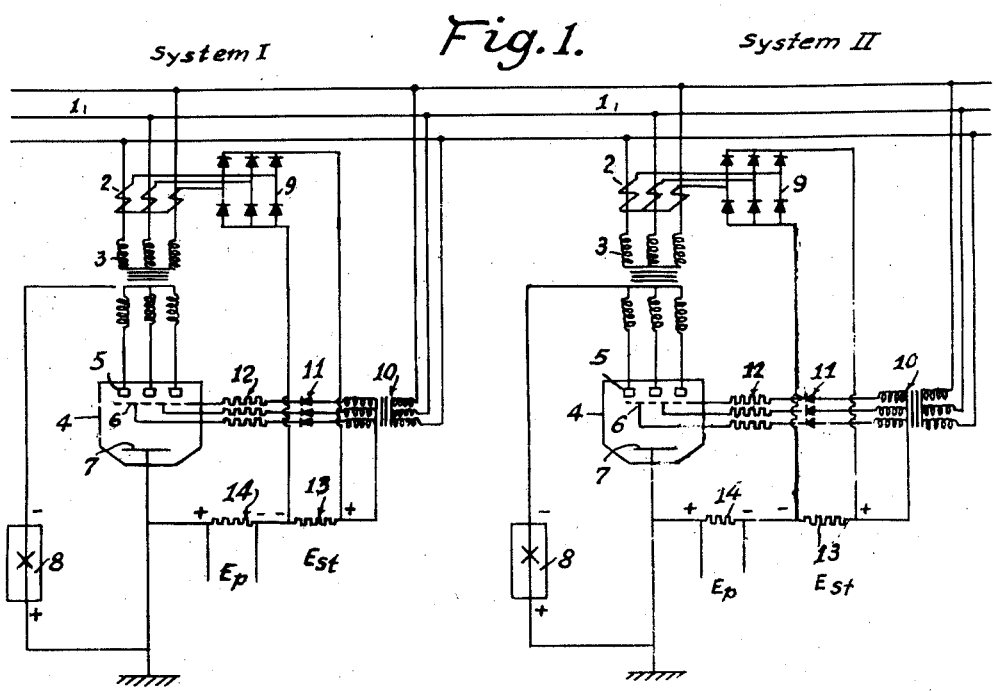
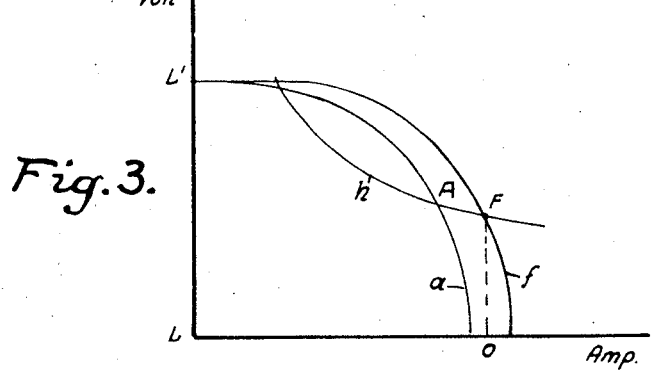
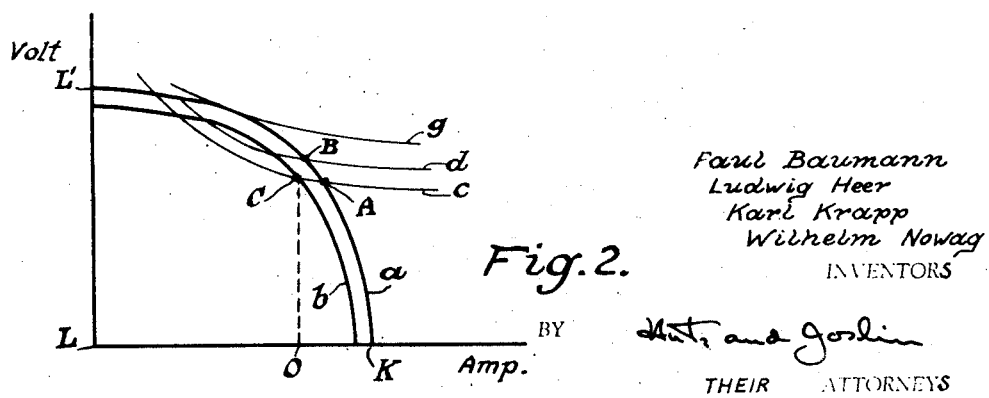
Paul Baumann
Ludwig Heer
Karl Krapp
Wilhelm Nowag
INVENTORS Patented Sept. 24, 1940

2,215,867

UNITED STATES PATENT OFFICE 2,215,867

INITIATION OF ELECTRIC ARCS FED BY CONTROLLED RECTIFIERS FOR CARRYING OUT CHEMICAL REACTIONS

Paul Baumann, Leuna, Ludwig Heer, Ludwigshafen-on-the-Rhine, and Karl Krapp and Wilhelm Nowag, Mannheim, Germany, assignors, by mesne assignments, to Jasco, Incorporated, a corporation of Louisiana Application February 7, 1939, Serial No. 255,027
In Germany February 9, 1938

5 Claims. (Cl. 175—354)

The present invention relates to improvements in the initiation of electric arcs fed by controlled rectifiers for carrying out chemical reactions.

It has already been proposed to feed electric arcs for carrying out chemical reactions, in particular for the production of unsaturated hydrocarbons, such as acetylene, from hydrocarbons richer in hydrogen, from controlled, in particular grid-controlled, rectifiers. The stabilization of the electric arc, which especially in the case of electric arcs burning in hydrocarbons is very difficult by reason of the very short time of de-ionization, is effected by regulating the direct voltage of the rectifier in dependence on the electric arc current by means of a control, as for example grid control, as far as possible free from inertia, so that the electric arc burns stably.

In the drawing:

Figure 1 is a diagram of an arc furnace system suitable for operation according to this invention.

Figs. 2 and 3 are curves illustrating the method of operation of the arcs according to the invention.

Fig. 1 shows diagrammatically a working example of a device such as is used for instance with electric arcs. The rectifiers 4 of systems I and II are fed from the line 1 through current transformer 2 and transformer 3, in order to automatically stabilize the electric arcs 8. Onto the grids 6 of rectifier 4 an alternating current is imposed by resistances 12 and valves 11 through a transformer 10 which is also connected to line 1. Onto this grid-alternating current a constant, positive direct current E lying at resistance 14 and a controlled direct current $E_{st}$ lying at resistance 13 are superimposed, the latter being obtained from line 1 through current transformer 2 and the rectifier valves 9. The displacement of the ignition impulses of the anodes 5 of rectifier 4 is then only dependent on the difference between the voltages $E_p$ and $E_{st}$. The electric arc furnaces 8a lie between the grounded cathodes 7 of rectifier 4, and the zero point of transformer 3. For example, if one switches on next to the already burning electric arc 8 of system I the electric arc 8 of system II, then decreases in voltage may occur in line 1 which may effect a breaking of the electric arc 8 of system I.

In order to explain the current and voltage conditions, the observation of the intersection of two characteristic lines (characteristics), greatly simplified for this method of operation, is used. To render things clear, the usual representation of a feeding characteristic and an electric arc characteristic is sufficient in this instance. With increasing load current of the rectifier, there is a falling voltage characteristic, as represented for example by the curve $a$ in Figure 2 of the accompanying drawing. The electric arc itself has a voltage characteristic in the shape of an equilateral hyperbola according to the curve $c$ or $d$ in Figure 2, different electric arc characteristics being given by the shape and nature of the reaction furnace. The operating point lies at the point of intersection A or B of the rectifier characteristic $a$ with electric arc characteristics $c$ or $d$, respectively.

A stable operation of electric arcs, especially of those burning in gases containing hydrocarbons, is only possible when the voltage characteristic $a$ of the rectifier cuts the electric arc characteristic $c$ as nearly vertically as possible because even with small current variations a variation in the rectifier voltage which is as great as possible must take place for the purpose of sufficient stabilization. The angle of intersection of the rectifier and electric arc characteristics at the point A is therefore a measure of the stability of the electric arc. If the arc characteristic $c$ moves for example towards $d$, which is possible with varying operating conditions, as for example the flow of gas, then by reason of the non-vertically falling course of the rectifier characteristic the angle of intersection of the two characteristics $a$ and $d$ at B becomes smaller than that of $a$ and $c$ at A and consequently the electric arc becomes less stable until the operation becomes impossible at a position of the electric arc characteristic according to the curve $g$ by reason of only a tangential contact of the rectifier characteristic $a$ and the electric arc characteristic $g$. As is known the ratio of the burning voltage to the no-load voltage is approximately equal to the power factor. This means that with a given rectifier characteristic, a stable electric arc operation is possible only with a certain upper limit value of the power factor. If this limit value of the power factor be exceeded for any reason, the electric arc becomes unstable and breaks. This applies especially to electric arcs which burn in hydrocarbons because by reason of the short time of de-ionization the operation of the electric arc is very unstable.

In the case of fluctuations in the voltage in the power line, the electric arc characteristic $c$ determined by the operating conditions remains stationary while there is a displacement of the rectifier characteristic. With a fall in voltage for example, the rectifier characteristic runs according to the curve $b$ in Figure 2 and intersects the determined electric arc characteristic $c$ at the point C. The angle of intersection of the electric arc characteristic $c$ with the rectifier characteristic $b$ is smaller than that with the rectifier characteristic $a$ at the point A. In relation to the lower no-load voltage of the curve $b$, the operating voltage C—O is also higher and consequently the power factor of the plant. If the above-mentioned limit value of the power factor for a stable operation is thereby exceeded, the electric arc will break. A breaking of the arc is therefore possible with strong fluctuations of voltage in the power line.

The ignition of the electric arc is effected by introducing a short-circuit at full voltage of the rectifier and producing an electric arc so that the ignition is initiated. The rectifier thus acts at the moment of ignition on a short-circuit. The short-circuit current is thereby limited by the rectifier characteristic $a$ of Figure 2 to the values L—K, which is, however, higher than the desired current and causes correspondingly great fall in voltage in the feeding line because it is wattless.

If several electric arcs are fed from one line through different rectifiers, then when setting into operation a further electric arc there occur by reason of the current impulse when igniting voltage fluctuations in the line which influence the stability of the electric arcs already burning.

If the electric arcs which are already burning are being operated with a power factor which is near the limiting power factor determined by the stability of the electric arc, the electric arcs which are already burning are rendered unstable by the initiation of a further electric arc by reason of the fall in voltage in the feeding line and the arcs break. The consecutive initiation of a number of electric arcs is thus possible only when all the burning arcs are continuously operated with a power factor which lies below the maximum possible value so that even in the case of a fall in voltage due to the ignition of further electric arcs the maximum possible value of the power factor is not exceeded. The plant cannot therefore be fully utilized.

The present invention relates to a method of initiating electric arcs fed by controlled, in particular grid-controlled, rectifiers, which arcs are connected to other electric arcs fed from the same line, in which during the ignition of one or more further electric arcs, by temporary reduction of the power factor of the electric arc or arcs already burning, any exceeding of the limiting power factor required for stable operation is avoided during the initiation of one or more further arcs. This is possible for example by increasing during the initiation of one or more further electric arcs the voltage of each single rectifier feeding an electric arc or by increasing the voltage of all the rectifiers which are in operation. On the other hand the whole feed line voltage may be increased during the initiation of one or more further electric arcs. In any case the voltage must be increased at least by an amount equal to the fall in voltage caused by the ignition of an electric arc.

Further possibilities are offered in the influencing of the control of the rectifiers feeding the electric arcs, in such manner that during the ignition of further electric arcs the burning electric arcs are operated with an increased current and lower power factors. By a displacement of the ignition impulse initiating the anode ignition in an advancing sense, the rectifier characteristic $a$ in Figure 3 of the drawing is displaced towards higher currents and thus assumes for example the course of the curve $f$. Since the electric arcs, with increasing arc current, has a lower burning voltage corresponding to the curve $h$, the electric arcs during the influencing of the grid control of the rectifier in the above sense burn at the point F with higher current but a lower power factor which corresponds to the ratio of the operating voltage F—O to the no-load voltage L—L'.

The influencing of the control in such manner that a variation of the ignition impulse relative to the anode voltage takes place in an advancing direction, may be effected by varying the control voltage in phase or height, by introducing foreign voltages influencing the control, or by varying the control voltage dependent on the current and influencing the control. Thus for example by inserting a constant voltage in the control circuit, the control may be influenced in the sense that a temporary advancement of the ignition impulse takes place. Similarly by varying the current-dependent control voltage, which influences the control, the control of the feeding rectifier may be varied.

Furthermore by temporary varying of the operating conditions, as for example by reducing the amount of gas passed through, a displacement of the electric arc characteristic to lower burning voltages and consequently a lowering of the power factor is possible.

The method according to this invention for initiating electric arcs for carrying out chemical reactions, in particular for the treatment of hydrocarbons, which are fed from grid-controlled rectifiers and which are connected to already burning electric arcs dependent on the same power line, renders it possible in ordinary operation, when no further electric arcs are ignited, to operate all the electric arcs always with the optimum power factor determined by the stability of the electric arcs.

The said method thus renders it possible to utilize the plant better both electrically and chemically, because the increase in the working efficiency with simultaneous reduction in the reactive volt-amperes, the component of the amperes not producing volt power, occurring with greater power factor also means an increased chemical yield.

What we claim is:

1. A method of initiating electric arcs fed by controlled rectifiers for carrying out chemical reactions, the electric arcs being connected to already burning electric arcs fed from the same power line, which consists in influencing the rectifier control and the flow of gas, during the initiation of said first arcs to adjust the power factor of the burning arcs so that the limiting power factor for stable operation of the arcs is not exceeded, and temporarily operating the burning arcs at said adjusted power factor.

2. A method as claimed in claim 1, which consists in influencing the control of the rectifiers feeding the electric arc, during the initiation of further electric arcs, in such manner that the burning electric arcs are operated with a higher current and a lower power factor.

3. A method as claimed in claim 1, which consists in so varying the control of the rectifiers in phase that a variation of the ignition impulse relative to the anode voltage takes place in an advancing direction.

4. A method as claimed in claim 1, which consists in so varying the control of the rectifiers in height that a variation of the ignition impulse relative to the anode voltage takes place in an advancing direction.

5. A method as claimed in claim 1, which consists in inserting in the control of the rectifiers a constant voltage which influences the control in the sense that a temporary advancement of the ignition impulse takes place.

PAUL BAUMANN.
LUDWIG HEER.
KARL KRAPP.
WILHELM NOWAG.